(12) United States Patent
Yokozawa et al.

(10) Patent No.: US 6,594,014 B2
(45) Date of Patent: Jul. 15, 2003

(54) COLOR DETECTING SENSOR AND METHOD FOR INK RIBBON

(75) Inventors: Mitsuo Yokozawa, Nagano (JP); Akihiro Yahata, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/838,595

(22) Filed: Apr. 20, 2001

(65) Prior Publication Data

US 2002/0001084 A1 Jan. 3, 2002

(30) Foreign Application Priority Data

Apr. 20, 2000 (JP) ..................... P. 2000-120114
Mar. 26, 2001 (JP) ..................... P. 2001-087517

(51) Int. Cl.$^7$ ..................... G01J 3/46; G01N 21/25
(52) U.S. Cl. ..................... 356/425; 356/402; 356/406; 356/407; 356/432
(58) Field of Search ..................... 356/402, 405, 356/406, 407, 425, 432; 250/226; 400/120.01, 120.02, 118.1, 240, 240.4, 237; 346/76.1

(56) References Cited

U.S. PATENT DOCUMENTS 5,501,537 A * 3/1996 Kohno ..................... 347/177
5,769,549 A * 6/1998 Kouzai et al. ..................... 400/237
5,781,219 A * 7/1998 Kouzai et al. ..................... 347/178
6,412,991 B1 * 7/2002 Klinefelter et al. ..................... 400/240

* cited by examiner

Primary Examiner—Michael G. Lee
Assistant Examiner—April Nowlin
(74) Attorney, Agent, or Firm—Sughrue Mion, PLLC

(57) ABSTRACT

A color detecting sensor includes a light emitting element for emitting red light, a light emitting element for emitting green light, a light emitting element for emitting blue light, a light receiving element for receiving light emitted from each of the light emitting elements through an ink ribbon, and detecting device for detecting a color of the ink ribbon forming at least a colorless and transparent portion and the colorless and transparent portion based on an output signal of the light receiving element, the detecting device including a storage section for storing, as color reference data, the output signal of the light receiving element when the light emitting elements emit light through the colorless and transparent portion of the ink ribbon respectively, and a color deciding section for comparing, with the color reference data, the output signal of the light receiving element when the light emitting elements emit light through the color formed on the ink ribbon respectively, thereby deciding the color of the ink ribbon.

12 Claims, 12 Drawing Sheets

| SEL1 | SEL2 | emitting LED |
|------|------|--------------|
| L | L | RED |
| L | H | GREEN |
| H | L | BLUE |

| port 1 | port 2 | port 3 | Emitting LED |
|---|---|---|---|
|  |  |  | LED |
| L | H | H | RED |
| H | L | H | GREEN |
| H | H | L | BLUE |

COLOR DETECTING SENSOR AND METHOD FOR INK RIBBON

BACKGROUND OF INVENTION

1. Field of Invention

The present invention relates to a color detecting sensor and a color detecting method. More specifically, the invention relates to a color detecting sensor and method for an ink ribbon to be used for a printer such as a thermal transfer printer utilizing a face sequential coating ink ribbon.

2. Related Art

A face sequential coating ink ribbon constituted by sequentially arranging ink coated faces having colors of cyan, magenta, yellow and black in a longitudinal direction is used for a printer such as a color thermal transfer printer. As a conventional color detecting sensor for detecting the color of the ink ribbon, for example, a black mark is given to a boundary between the colors of the ink ribbon and one light source such as an LED (light emitting diode) and two light receiving sensors such as photodiodes are provided with the ink ribbon interposed therebetween. The color detecting sensor detects the mark given to the ink ribbon through the light receiving sensor according to the delivery of the ink ribbon, thereby detecting the head of a delivery direction of each ink coated face and deciding the color based on the order of the ink coated face and a signal detected by the light receiving sensor.

Moreover, some other color detecting sensors for an ink ribbon according to the conventional example use two LEDs, that is, an LED having such a wavelength that light absorption for a first color of the ink ribbon having the four colors is the greatest and an LED having such a wavelength that light absorption for a third color is the greatest, thereby deciding a color based on a combination of detection signals corresponding to the two LEDs which are detected by the light receiving sensor. In this case, it is possible to detect the four colors of the ink ribbon without providing a mark for color detection on the ink ribbon.

In the case of an ink ribbon including an overprint layer for protecting a print face in addition to ink coated faces having the colors of cyan, magenta, yellow and black, however, there is a problem in that the color detecting sensors using the two conventional LEDs cannot distinguish the ink coated face having the color of yellow which can transmit red light, green light and infrared light very well from the overprint layer because the overprint layer is colorless and transparent.

On the other hand, there is a problem in that the area of the ribbon is increased to result in an increase in cost and waste of resources when a mark is given to the boundary between the colors of the ink ribbon.

Moreover, in the case in which the mark is not given to the ink ribbon, for example, only the ink coated face having the color of black is detected to specify the position of a head for each color based on a feed amount therefrom, it is necessary to provide a mechanism or sensor for accurately measuring the feed amount of the ink ribbon. Consequently, the device becomes complicated. Moreover, every time a power is turned on, it is necessary to excessively feed the ink ribbon to take the head position to be a reference. Therefore, there is a problem in that the resources are wasted and the cost is increased.

For example, in a conventional printer using an ink ribbon, in some cases in which the power of the printer is once turned OFF and is turned ON again, a different color from yellow (for example, a color prior to the yellow) is taken under a thermal head, for example, even if the yellow is detected on the color detecting sensor side. In some cases, moreover, the ink ribbon is excessively wound up so that a yellow portion for printing one screen (for example, a part corresponding to the size of a card) is not maintained, for example. In the conventional printer, therefore, it is necessary to provide a back tension coil on a delivery shaft, for example, and to reversely rotate a winding shaft, thereby rewinding the ink ribbon present under the thermal head up to the color detecting sensor and reconfirming the color when the color detecting sensor detects yellow during power-ON. However, the back tension coil has an original object to take up the slack. If the amount of rewinding is to be maintained to some extent irrespective of a change in a winding diameter, a back tension should also be increased. For this reason, a winding motor having a large size is required for winding up the ink ribbon against the back tension. Moreover, a tension applied to the ink ribbon is increased and there is a high possibility that the ribbon might be cut.

SUMMARY OF INVENTION

It is an object of the invention to provide a color detecting sensor and method for an ink ribbon which can detect a color, with an inexpensive and small-sized structure, also in an ink ribbon including a colorless and transparent portion such as an overprint layer.

In order to achieve the object, a first aspect of the invention is directed to a color detecting sensor for an ink ribbon comprising a first light emitting element for emitting red light, a second light emitting element for emitting green light, a third light emitting element for emitting blue light, a light receiving element for receiving light emitted from each of the first, second and third light emitting elements through the ink ribbon, and detecting means for detecting a color of the ink ribbon forming at least a colorless and transparent portion and the colorless and transparent portion based on an output signal of the light receiving element, the detecting means including a storage section for storing, as color reference data, the output signal of the light receiving element when the first, second and third light emitting elements emit light through the colorless and transparent portion respectively, and a color deciding section for comparing, with the color reference data, the output signal of the light receiving element when the first, second and third light emitting elements emit light through the color formed on the ink ribbon respectively, thereby deciding the color of the ink ribbon.

Accordingly, the color reference data are acquired and compared with the output signal measured through the color formed on the ink ribbon. Consequently, it is possible to decide the corresponding color of the ink ribbon based on the characteristic of the output signal for each of the red light, the green light and the blue light.

Moreover, a second aspect of the invention is directed to the color detecting sensor for an ink ribbon according to the first aspect of the invention, wherein the ink ribbon has five kinds of colors of yellow, magenta, cyan, black and a colorless portion.

Accordingly, even if a special mark is not given to the ink ribbon, the colorless portion and yellow can be distinguished from each other. Thus, it is possible to constitute an ink ribbon capable of carrying out printing well.

Furthermore, a third aspect of the invention is directed to a color detecting method for an ink ribbon comprising a first light emitting element for emitting red light, a second light emitting element for emitting green light, a third light emitting element for emitting blue light, a light receiving element for receiving light emitted from each of the first, second and third light emitting elements through the ink ribbon, and detecting means for detecting a color of the ink ribbon forming at least a colorless and transparent portion and the colorless and transparent portion based on an output signal of the light receiving element, the detecting means serving to store, as color reference data, the output signal of the light receiving element when the first, second and third light emitting elements emit light through the colorless and transparent portion respectively, and to compare, with the color reference data, the output signal of the light receiving element when the first, second and third light emitting elements emit light through the color formed on the ink ribbon respectively, thereby deciding the color of the ink ribbon.

Accordingly, the color reference data are acquired and compared with the output signal measured through the color formed on the ink ribbon. Consequently, it is possible to decide the corresponding color of the ink ribbon based on the characteristic of the output signal for each of the red light, the green light and the blue light.

Moreover, a fourth aspect of the invention is directed to the color detecting sensor for an ink ribbon according to the first or second aspect of the invention, wherein the light receiving element is provided on this side for one color of the ink ribbon from a head portion for transferring the ink ribbon to a medium.

Furthermore, a seventh aspect of the invention is directed to the color detecting method for an ink ribbon according to the third aspect of the invention, wherein the light receiving element is provided on this side for one color of the ink ribbon from a head portion for transferring the ink ribbon to a medium and serves to detect a boundary of colors of the ink ribbon on this side for one color of the ink ribbon from the head portion.

Accordingly, the color of the ink ribbon can be detected on this side for one color of the ink ribbon from the head portion. The case in which the color of the ink ribbon which is detected through the color detecting sensor is changed implies that the boundary of the colors of the ink ribbon passes through the light receiving element on this side for one color of the ink ribbon from the head portion. On the other hand, when the boundary of the colors of the ink ribbon is positioned on the light receiving element on this side for one color of the ink ribbon from the head portion, the start position of the color of the ink ribbon is set in the position of the head portion. In other words, the boundary of the colors of the ink ribbon is detected on this side for one color of the ink ribbon from the head portion so that the start position of the color of the ink ribbon can be aligned with the head portion.

More specifically, a fifth aspect of the invention is directed to the color detecting sensor for an ink ribbon according to the fourth aspect of the invention, wherein at least two light receiving elements are provided and serve to detect at least two colors constituting a boundary of the colors of the ink ribbon on this side for one color of the ink ribbon from the head portion.

Furthermore, an eighth aspect of the invention is directed to the color detecting method for an ink ribbon according to the seventh aspect of the invention, wherein at least two light receiving elements are provided and serve to detect at least two colors constituting a boundary of the colors of the ink ribbon on this side for one color of the ink ribbon from the head portion.

Accordingly, in the case in which at least two colors are detected by at least two light receiving elements, the boundary of the colors of the ink ribbon is present on this side for one color of the ink ribbon from the head portion and the start position of the color of the ink ribbon is set in the position of the head portion. In other words, when at least two light receiving elements detect different colors based on the positional relationship between the head portion and at least two light receiving elements, the color detected by the light receiving element on the side closer to the head portion is surely present under the head portion, and furthermore, a length required for printing can be maintained. Moreover, at least two light receiving elements are used. Consequently, it is possible to detect the boundary of the colors of the ink ribbon on this side for one color of the ink ribbon from the head portion even if the ink ribbon is stationary.

Moreover, a sixth aspect of the invention is directed to a color detecting sensor for an ink ribbon, wherein at least two color detecting sections for detecting a color of the ink ribbon are provided and serve to detect at least two colors constituting a boundary of the colors of the ink ribbon on this side for one color of the ink ribbon from a head portion for transferring the ink ribbon to a medium.

Furthermore, a ninth aspect of the invention is directed to a color detecting method for an ink ribbon, comprising the steps of detecting at least two colors constituting a boundary of colors of the ink ribbon on this side for one color of the ink ribbon from a head portion for transferring the ink ribbon to a medium and aligning a start position of the color of the ink ribbon with the head portion.

Accordingly, in the case in which at least two colors of the ink ribbon are detected on this side for one color of the ink ribbon from the head portion, the boundary of the colors of the ink ribbon is provided on this side for one color of the ink ribbon from the head portion. At the same time, the start position of any of the detected colors on the side closer to the head portion is set in the position of the head portion. In other words, the boundary of the colors of the ink ribbon is detected on this side for one color of the ink ribbon from the head portion. Consequently, the start position of the color of the ink ribbon can be aligned with the head portion.

DETAILED DESCRIPTION OF PREFERRED EMBODIMENTS

Figure 1:
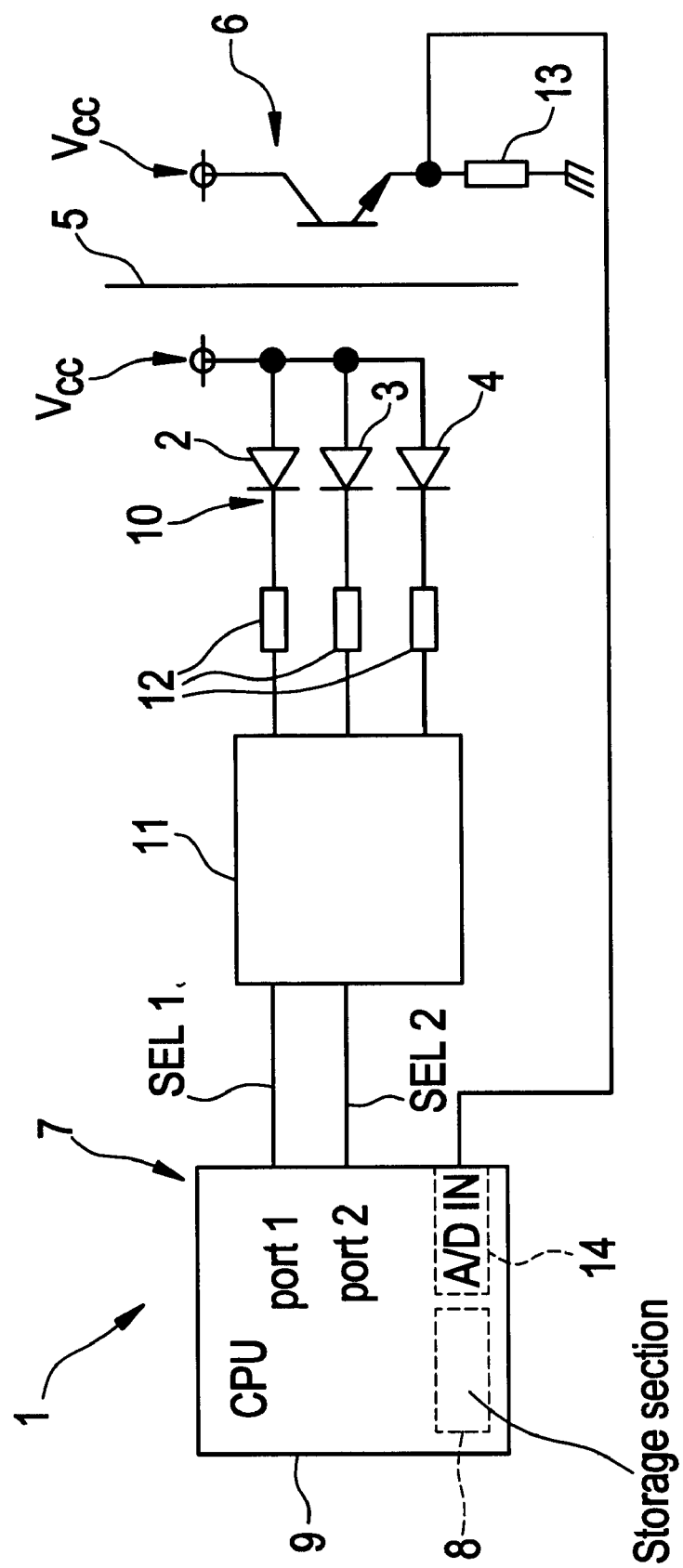
FIG. 1 is a schematic block diagram showing an example of an embodiment of a color detecting sensor for an ink ribbon according to the invention.

A structure according to the invention will be described below in detail based on an embodiment shown in the drawings.

FIGS. 1 to 7 show an embodiment of a color detecting sensor for an ink ribbon according to the invention. A color detecting sensor 1 comprises a first light emitting element 2 for emitting red light, a second light emitting element 3 for emitting green light, a third light emitting element 4 for emitting blue light, a light receiving element 6 for receiving, through an ink ribbon 5, light emitted from each of the first, second and third light emitting elements 2, 3 and 4, and detecting means 7 for detecting the color of the ink ribbon 5 forming at least a colorless and transparent portion and the colorless and transparent portion based on an output signal of the light receiving element 6. The detecting means 7 includes a storage section 8 for storing, as color reference data, the signal output from the light receiving element 6 when the light is emitted from the first, second and third light emitting elements 2, 3 and 4 respectively through the colorless and transparent portion of the ink ribbon 5, and a color deciding section 9 for comparing, with the color reference data, the signal output from the light receiving element 6 when the light is emitted from the first, second and third light emitting elements 2, 3 and 4 respectively through the color formed on the ink ribbon 5, thereby deciding the color of the ink ribbon 5.

The ink ribbon 5 includes a colorless and transparent overprint layer (indicated as OP in the drawing) for protecting a print face in addition to an ink applied face of yellow (indicated as Y in the drawing), magenta (indicated as M in the drawing), cyan (indicated as C in the drawing) and black (indicated as K in the drawing), for example, and is an uneven ink ribbon constituted by sequentially arranging the five color patterns in a longitudinal direction. More specifically, assuming that the overprint layer has a colorless and transparent color, the ink ribbon 5 according to the embodiment has five colors in total. Moreover, the ink ribbon 5 is constituted by repetition of yellow, magenta, cyan, black and the overprint layer in order.

For example, an LED (light emitting diode) is used for the light emitting elements 2, 3 and 4. In the embodiment, for example, an LED for emitting red light (which will be hereinafter referred to as a red LED 2 in the embodiment), an LED for emitting green light (which will be hereinafter referred to as a green LED 3 in the embodiment) and an LED for emitting blue color (which will be hereinafter referred to as a blue LED 4) are integrated to constitute an LED array 10. The LED array 10 is obtained by mounting the red LED 2, the green LED 3 and the blue LED 4 on one package, for example.

For example, a phototransistor is used for the light receiving element 6. It is desirable that the light receiving characteristic of the light receiving element 6 (which will be hereinafter referred to as a phototransistor 6) should be flat in a visible light range if possible.

The detecting means 7 is constituted by utilizing a CPU (central processing unit) capable of executing a processing as the color deciding section 9 and the storage section 8 for storing color reference data. The storage section 8 utilizes a memory (hereinafter referred to as a color reference register 8 in this specification) provided in the color deciding section 9 (hereinafter referred to as a CPU 9).

Figures 2, 3:
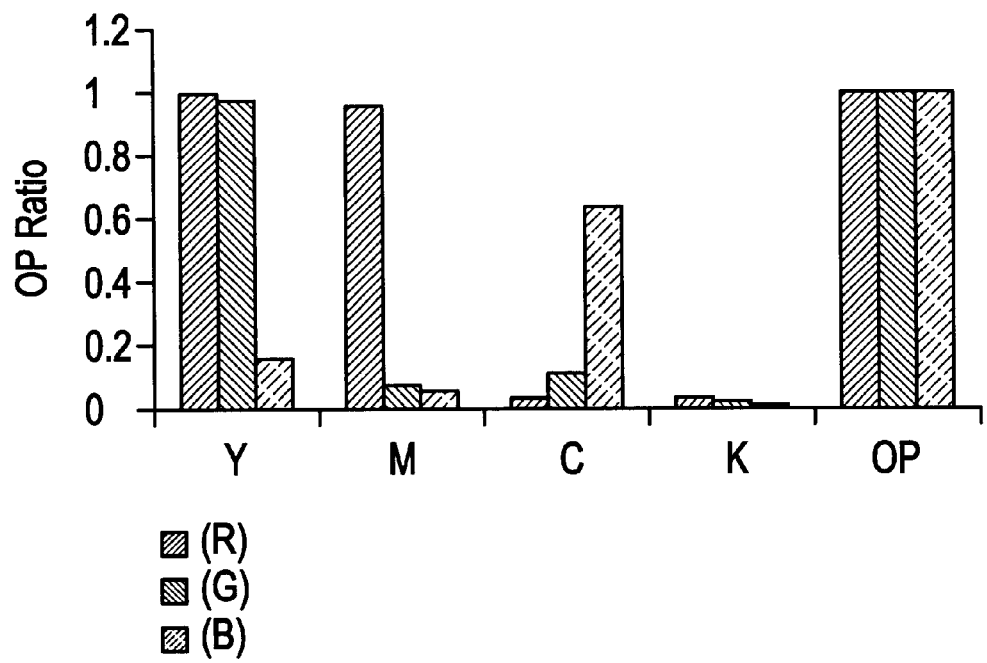
FIG. 2 is a truth table of a CPU output and a light emitting element output in the case in which a decoder is used in the color detecting sensor.
FIG. 3 is a graph showing an example of an output voltage ratio on an ink coated face having each color in the case in which an output voltage is set to 1 on an overprint layer.

The color detecting sensor 1 has the following structure, for example. Two output ports SEL 1 and SEL 2 of the CPU 9 are connected to a select input of a decoder 11 such as an LS 139, and three of four outputs are connected to cathodes of the red LED 2, the green LED 3 and the blue LED 4 through current limiting variable resistors 12, 12 and 12, respectively. Moreover, anode commons of the red LED 2, the green LED 3 and the blue LED 4 are connected to a power supply line Vcc (+5V). With such a structure, signals of the output ports SEL 1 and SEL 2 of the CPU 9 are switched into "H" and "L" at regular intervals. Consequently, the red LED 2, the green LED 3 and the blue LED 4 are driven with time division to sequentially emit light. In this case, two or more LEDs are prevented from emitting light at the same time. FIG. 2 shows a truth table in which the decoder 11 according to the embodiment is used.

One phototransistor 6 is provided in an opposite position to the LED array 10 with the ink ribbon 5 interposed therebetween. The phototransistor 6 has a collector connected to a Vcc (+5V) and an emitter connected to a GND through a load variable resistor 13 for current-voltage conversion. Moreover, the emitter is connected to an input of an A/D converter 14 of the CPU 9 such that the CPU 9 can read an output voltage of the phototransistor 6. Consequently, the CPU 9 can read the output voltage of the phototransistor 6 from A/D data obtained from the A/D converter 14 within a time required for light emission of each of the red LED 2, the green LED 3 and the blue LED 4, thereby individually measuring a ray transmittance of the ink ribbon 5 to each of the LEDs.

Figure 4:
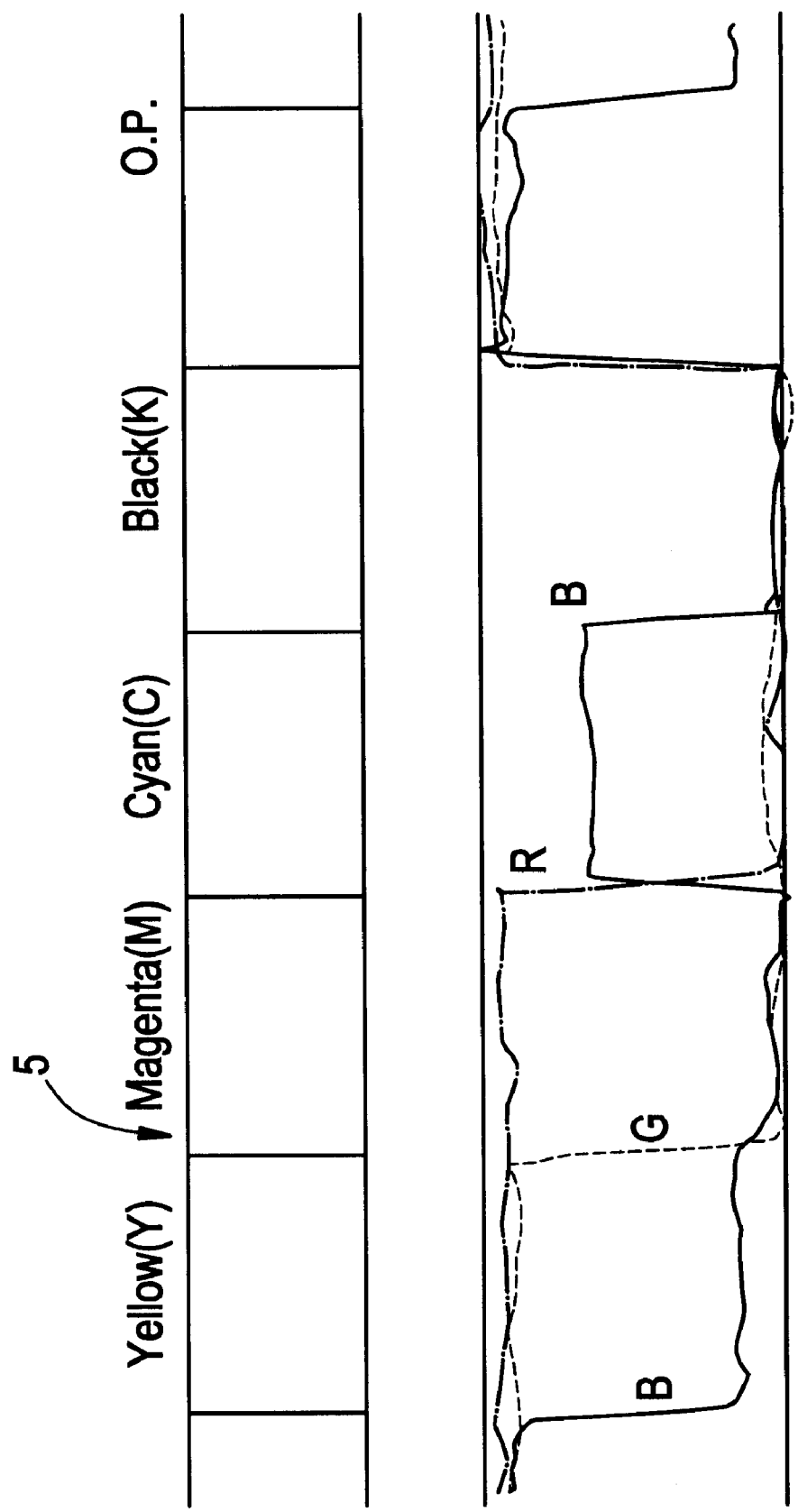
FIG. 4 is a graph showing the state of an output on the ink coated face having each color of the ink ribbon.
Figure 5:
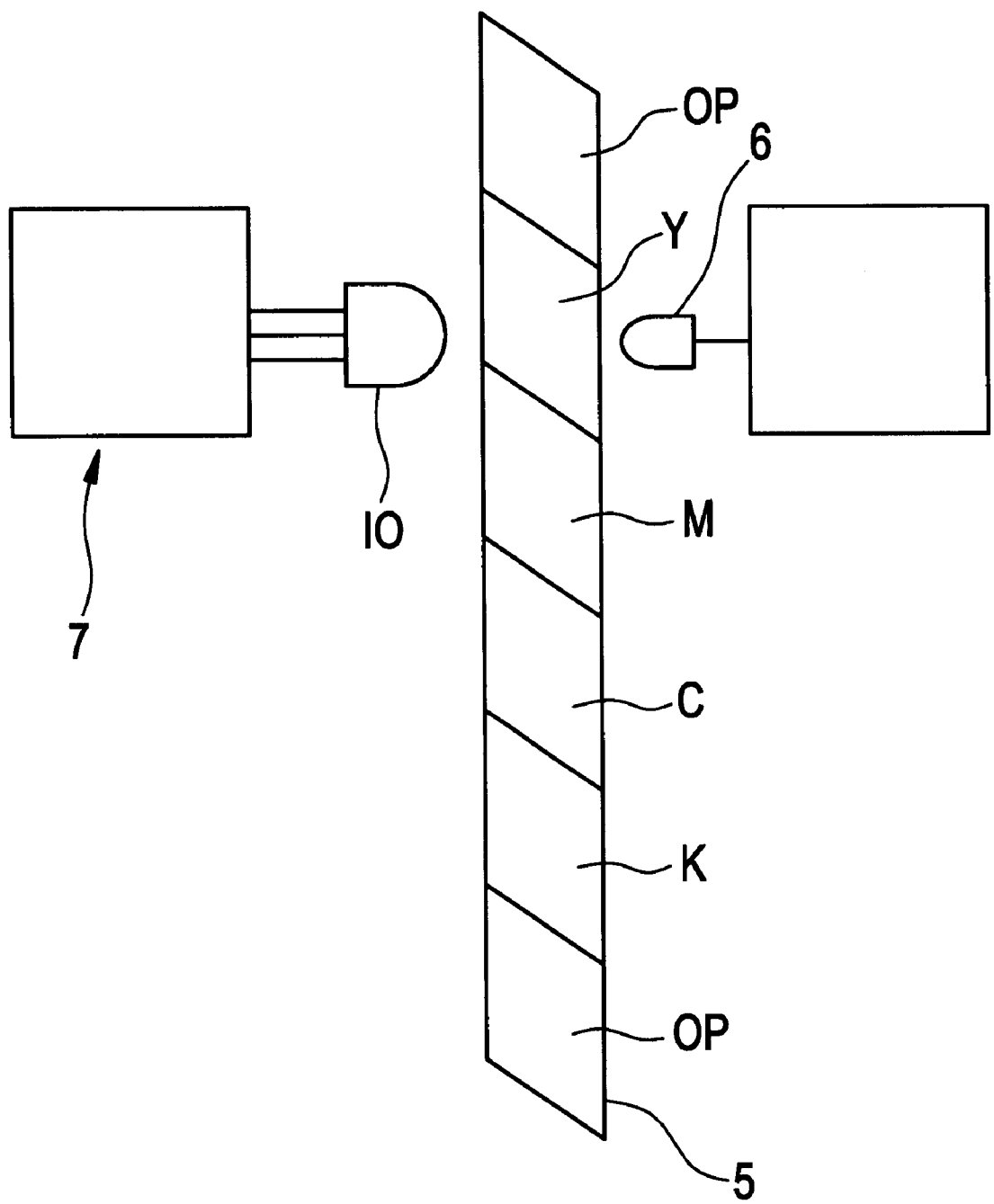
FIG. 5 is a schematic view showing an example of the structure of the color detecting sensor.

FIG. 3 shows an example of an output voltage ratio on an ink coated face having each color in which an output voltage in an overprint layer is set to 1. Moreover, FIG. 4 shows a status of an output voltage on an ink coated face having each color of the ink ribbon 5. As shown in both drawings, the output voltages for the red LED 2, the green LED 3 and the blue LED 4 on the color ink coated face of yellow, magenta, cyan, black and the overprint layer have different characteristics (indicated as R, G and B in the drawing, respectively).

According to the color detecting sensor 1 having such a structure, therefore, the A/D data on the output voltages for the red LED 2, the green LED 3 and the blue LED 4 on the overprint layer are stored in the color reference register 8 respectively to be color reference data and are compared with A/D data optionally measured for the red LED 2, the green LED 3 and the blue LED 4 through the color formed on the ink ribbon 5. Thus, the corresponding color of the ink ribbon 5 can be decided.

For example, the color detecting sensor 1 decides the color of the ink ribbon 5 in the following manner.

The CPU 9 first finds a region in which the output voltage is stable, for example, to acquire the color reference data and decides, as the overprint layer, a region in which the output voltage of the blue LED 4 is the highest. Then, the A/D data on each output voltage for the light emission of the red LED 2, the green LED 3 and the blue LED 4 on the overprint layer are stored in the predetermined color reference register 8, respectively. In the embodiment, a storage region of the color reference register 8 corresponding to the red LED 2, a storage region of the color reference register 8 corresponding to the green LED 3 and a storage region of the color reference register 8 corresponding to the blue LED 4 will be hereinafter referred to as R-ref, G-ref and B-ref, respectively.

Figure 7:
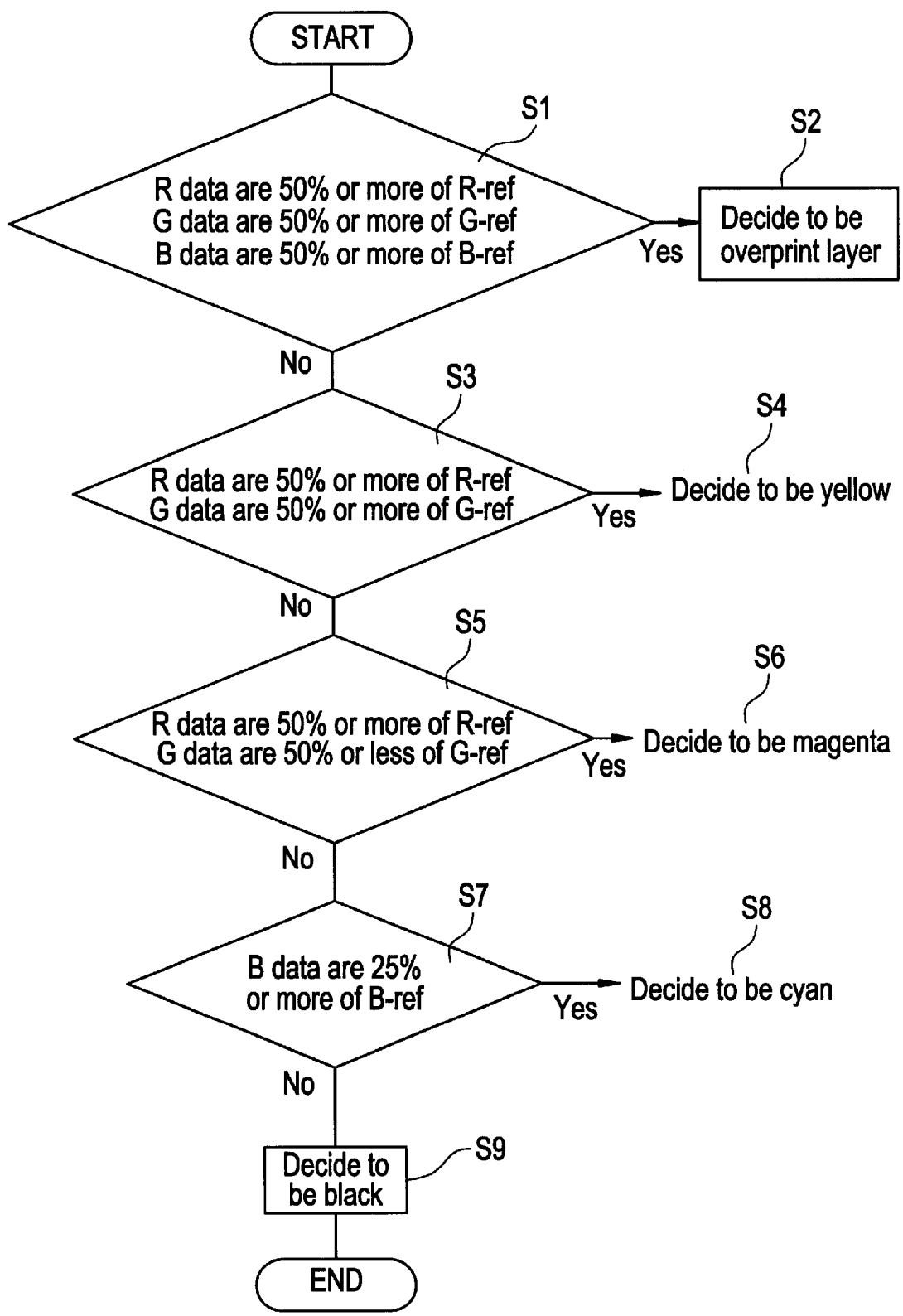
FIG. 7 is a flow chart showing an example of the procedure for deciding the color of the ink ribbon.

The color of the ink ribbon 5 is decided in accordance with a flow chart shown in FIG. 7.

More specifically, if the A/D data (hereinafter referred to as R data, G data and B data, respectively) measured by the CPU 9 for light emission of the red LED 2, the green LED 3 and the blue LED 4 are 50% or more of the values of the R-ref, the G-ref and the B-ref respectively (Step 1; Yes), the color is decided as the overprint layer (Step 2).

If it is not applicable (Step 1: No) and the R data are 50% or more of the value of the R-ref and the G data are 50% or more of the value of the G-ref (Step 3; Yes), the color is decided as yellow (Step 4).

If it is not applicable (Step 3; No) and the R data are 50% or more of the value of the R-ref and the G data are 50% or less of the value of the G-ref (Step 5; Yes), the color is decided as magenta (Step 6).

If it is not applicable (Step 5; No) and the B data are 25% or more of the value of the B-ref (Step 7; Yes), the color is decided as cyan (Step 8). If any case is not applicable, the color is decided as black (Step 9).

Figure 6:
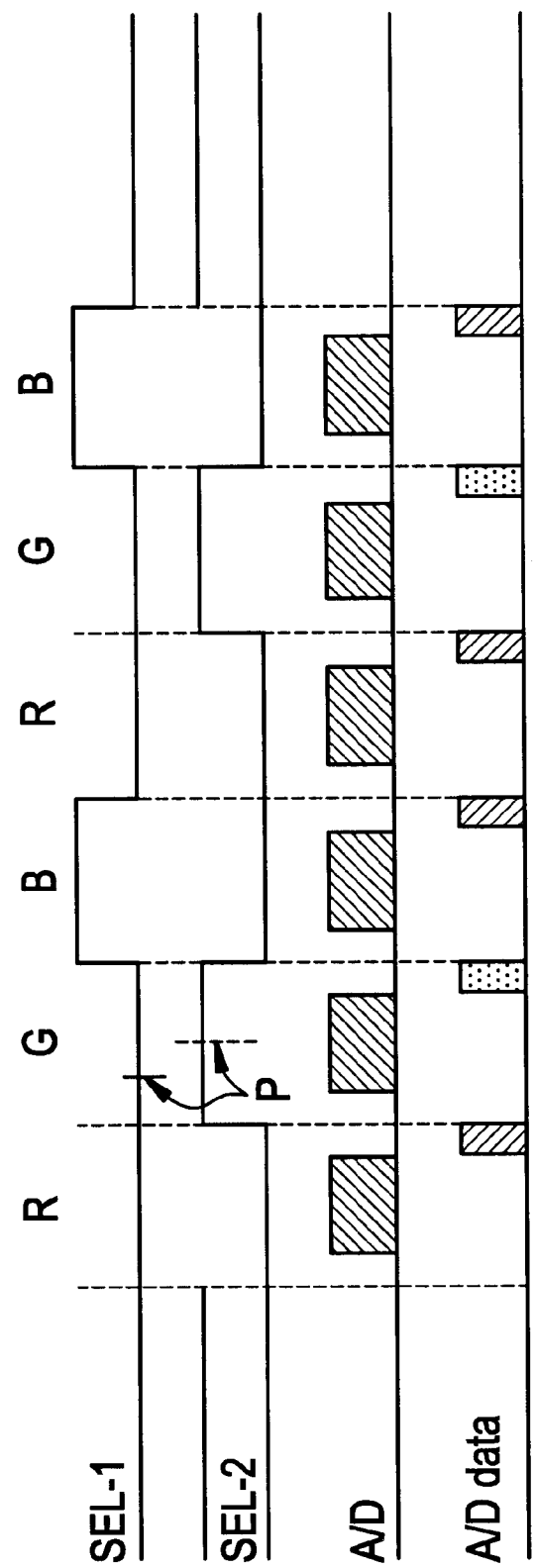
FIG. 6 is a timing chart showing an example of the operation of the color detecting sensor.

FIG. 6 is a timing chart showing an example of the operation of the color detecting sensor 1. When the ink ribbon 5 is moving, it is particularly necessary to carefully decide a color in a boundary region between the colors. In order to take countermeasures, the color detecting sensor 1 according to the embodiment reads an output voltage twice as shown in an arrow P point in FIG. 6 within a time required for light emission of the LED having the same color, for example. By way of example, if a difference in a signal level between the output voltages thus read twice is 10% or less, it is decided to be normal and a mean value thereof is employed. In the case in which the output voltage is not always read twice but the output voltage is continuously read at a predetermined time interval and a difference between adjacent signal levels is 10% or less, a mean value thereof may be employed. In the color detecting sensor 1 according to the embodiment, moreover, the execution of the A/D converter 14 is started after approximately 100 μsec, for example, until the output voltage is stabilized after the output ports SEL 1 and SEL 2 of the CPU 9 are switched in order to detect a color more accurately.

Figure 8:
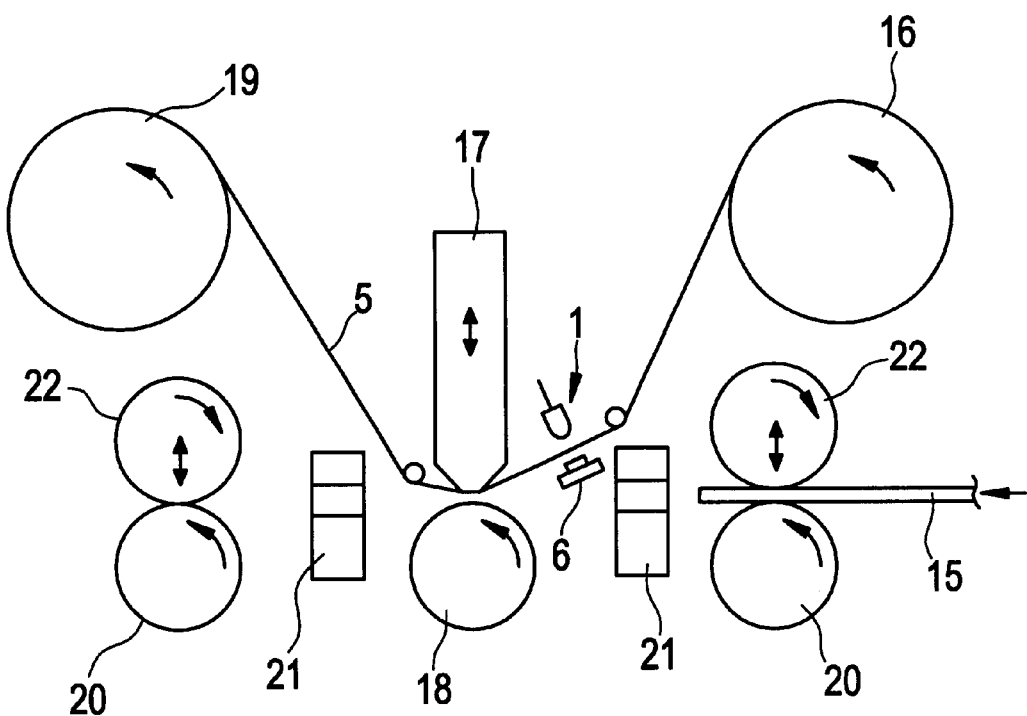
FIG. 8 is a schematic view showing an example in which the color detecting sensor is applied to a printer for printing an image on a plastic card.

FIG. 8 shows an example in which the color detecting sensor 1 is applied to a printer for printing an image on a plastic card 15. The color detecting sensor 1 is provided in a position close to a thermal head 17 in the middle of a path through which the ink ribbon 5 passes from a winding reel 16 side of the ink ribbon 5 toward a thermal head 17, for example.

For example, in the case in which the head of the ink ribbon 5 is to be taken immediately after the exchange of the ink ribbon 5, the color detecting sensor 1 sequentially emits light from the red LED 2, the green LED 3 and the blue LED 4 and monitors the output voltage of the phototransistor 6 for each light emission to detect and decide the color of the ink ribbon when the ink ribbon 5 is wound up by a predetermined length.

If the order of the colors decided with the wind-up of the ink ribbon 5 is coincident with the order of yellow, magenta, cyan, black and the overprint layer, it is decided to be normal. If they are not coincident with each other, it is decided to be abnormal, for example, the used ink ribbon 5 is given.

By utilizing the color detecting sensor 1, moreover, the printer can detect a point of change of the color of the ink ribbon 5 and can regulate the feed amount of the ink ribbon 5 based thereon, thereby providing the ink ribbon 5 having a color suitable for the thermal head 17, for example. The printer carries out printing on the card 15 in the following manner, for example.

In the state in which the thermal head 17 is raised from a platen roller 18, the ink ribbon 5 is wound up through a winding reel 19. Correspondingly, the color detecting sensor 1 detects the point of change from the overprint layer to yellow. The printer stops the wind of the ink ribbon 5 after a predetermined time since the detection time and regulates the head of yellow to be positioned passing through the thermal head 17.

Next, the card 15 is delivered through a delivery roller 20 in a left direction of the drawing. A card detecting sensor 21 detects that the head of the card 15 reaches a portion provided just under the thermal head 17 and then stops the delivery of the card 15. The thermal head 17 is caused to fall and the card 15 is interposed between the platen roller 18 and the thermal head 17. Thereafter, a pinch roller 22 of the delivery roller 20 is released.

The platen roller 18 is rotated while a winding torque is applied to the ink ribbon 5, the card 15 and the ink ribbon 5 are moved synchronously in the left direction of the drawing and print data are sent to the thermal head 17 so that a yellow image is printed on the card 15. Moreover, the ink ribbon 5 passes through the color detecting sensor 1 during the printing. Therefore, the color detecting sensor 1 detects the points of change of yellow and magenta. For example, the detection time or the position of the ink ribbon 5 is recognized and stored in a memory. Consequently, the head of magenta can be then regulated to be stopped in a position passing through the thermal head 17 by stopping the platen roller 18, raising the thermal head 17 and winding the ink ribbon 5 in a predetermined amount.

Figure 9:
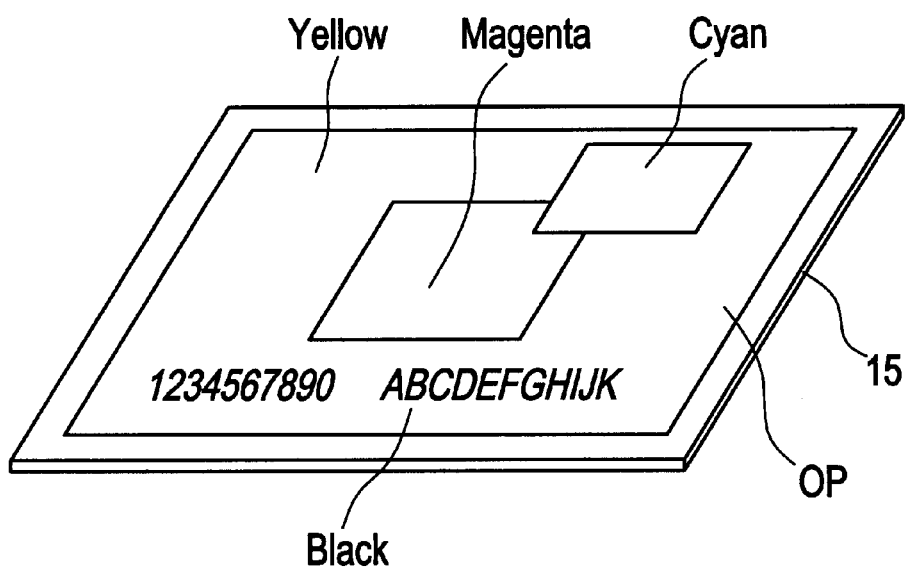
FIG. 9 is a schematic perspective view showing the state of a card in which printing is completed in the printer.

Subsequently, the card 15 is delivered in a right direction of the drawing and is returned to a printing start position again, and a magenta image is printed thereon. This operation is repeated. After the printing operation is completed up to the overprint layer, the card is discharged and a series of operations are thus ended. FIG. 9 shows the state of the card in which the printing has been completed.

As described above, according to the color detecting sensor 1 and the color detecting method, a color can properly be detected from the ink ribbon 5 including the overprint layer without giving a special mark to the ink ribbon 5. Moreover, it is possible to decide all the colors of yellow, magenta, cyan, black and the overprint layer. Therefore, a printer having a smaller size can be constituted more inexpensively than a printer for detecting only a specific color and specifying the position of the ink ribbon 5 based on the feed amount therefrom.

While the embodiment is a preferred example of the invention, it is not restricted but various modifications can be made without departing from the scope of the invention.

For example, one phototransistor 6 is not restricted but may be provided individually corresponding to the red LED 2, the green LED 3 and the blue LED 4.

Figure 10:
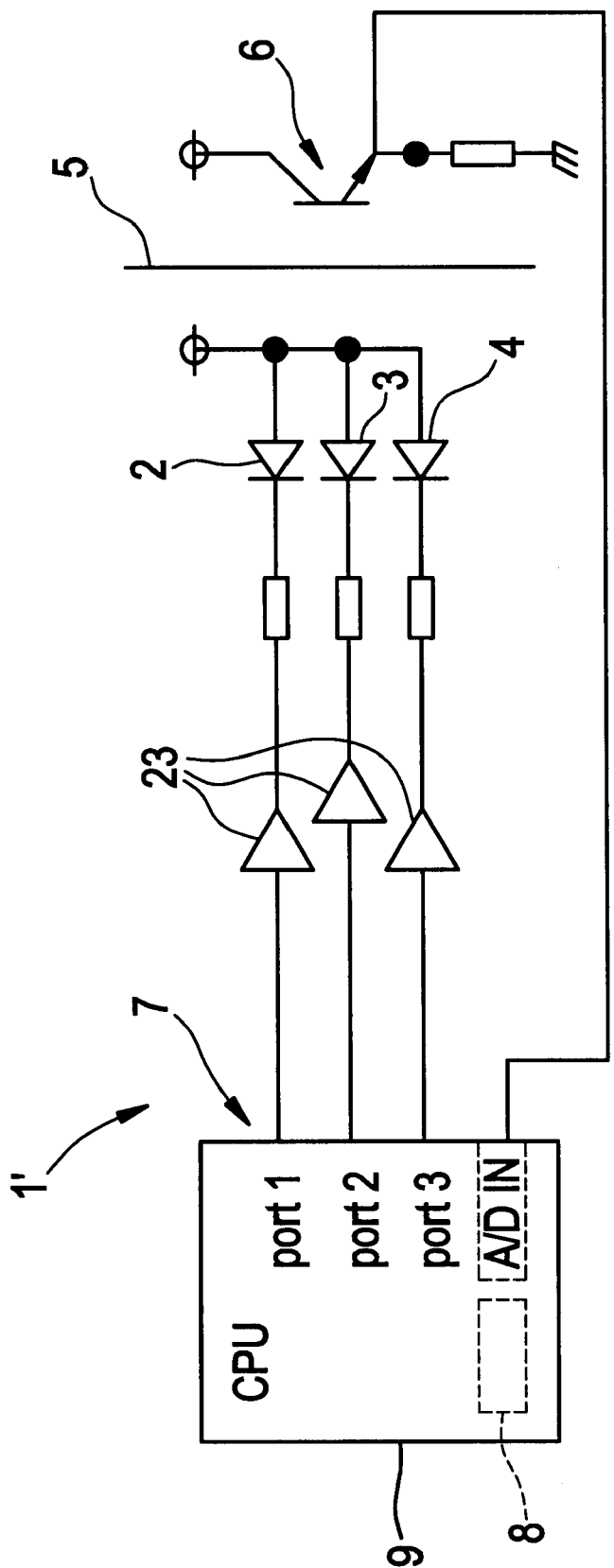
FIG. 10 is a schematic block diagram showing another example of the embodiment of the color detecting sensor of the ink ribbon according to the invention.
Figures 11, 12:
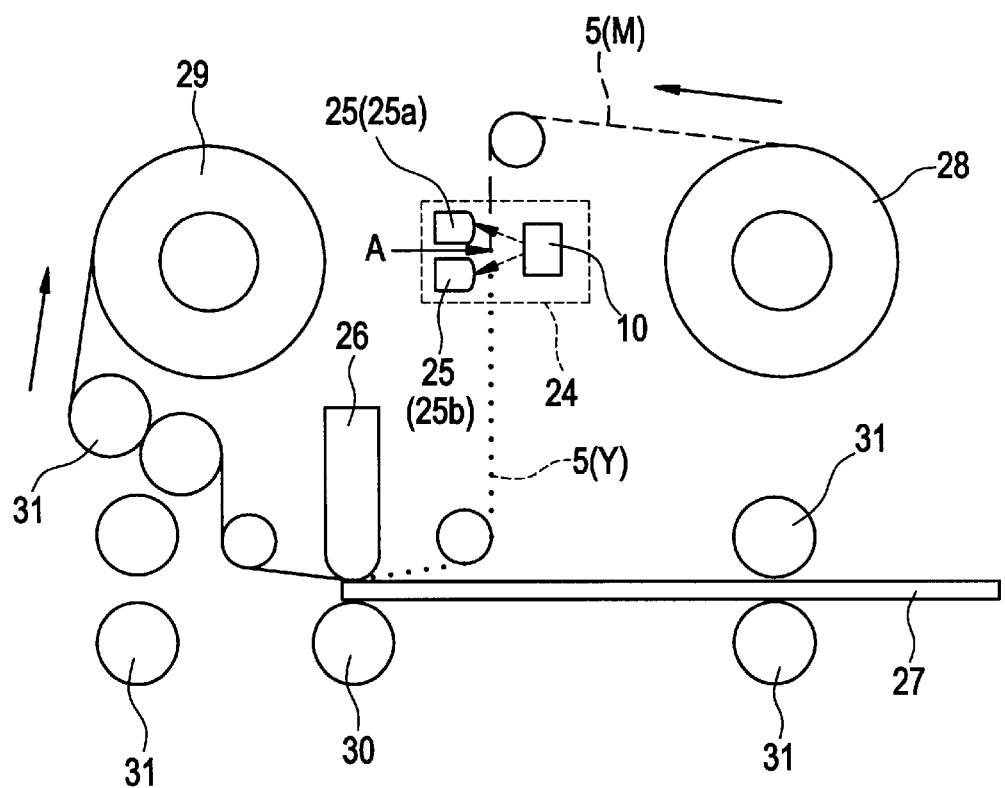
FIG. 11 is a truth table of a CPU output and a light emitting element output in the example of another color detecting sensor.
FIG. 12 is a schematic view showing a second embodiment of the color detecting sensor according to the invention, illustrating an example in which the color detecting sensor is applied to a printer for printing an image on a plastic card.

As shown in FIG. 10, moreover, the red LED 2, the green LED 3 and the blue LED 4 may be directly connected to three output ports of the CPU 9 in place of the decoder 11 and may be directly driven by the CPU 9. FIG. 11 shows a truth table in this case. In the case in which the current driving capability of the CPU 9 is insufficient, a buffer 23 may be added to the red LED 2, the green LED 3 and the blue LED 4, respectively.

Moreover, the LED array 10 and the phototransistor 6 may not be opposed to each other but may be provided on the same side, and a reflector plate may be provided in a position opposite to the LED array 10 and the phototransistor 6 with the ink ribbon 5 interposed therebetween to detect the light of the LED array 10 reflected by the reflector plate through the phototransistor 6.

Next, description will be given to a second embodiment of the color detecting sensor of the ink ribbon according to the invention shown in FIGS. 12 to 15.

A color detecting sensor 24 includes at least two color detecting sections 25 for detecting the color of the ink ribbon 5 to detect at least two colors constituting the boundary of the colors of the ink ribbon 5 on this side for one color of the ink ribbon 5 from a head portion 26 for transferring the ink ribbon 5 to a medium through at least two color detecting sections 25, . . . , 25.

It is preferable that the color detecting sensor according to the embodiment should be utilized for the color detecting sensor 24 including the color detecting section 25 for detecting the color of the ink ribbon 5, for example. In this case, the color detecting section 25 to be means for detecting the color of the ink ribbon 5 is a light receiving element for outputting a signal to decide the color of the ink ribbon 5, for example. In this case, for example, at least two light receiving elements 25a and 25b are provided on this side for one color of the ink ribbon 5 from the head portion 26 for transferring the ink ribbon 5 to the medium.

FIG. 12 shows an example in which the color detecting sensor 24 is applied to a printer for printing an image on a medium (for example, a plastic card 27). The reference numeral 28 denotes a feed reel, the reference numeral 29 denotes a winding reel, the reference numeral 30 denotes a platen roller and the reference numeral 31 denotes a card delivery roller.

Figure 13:
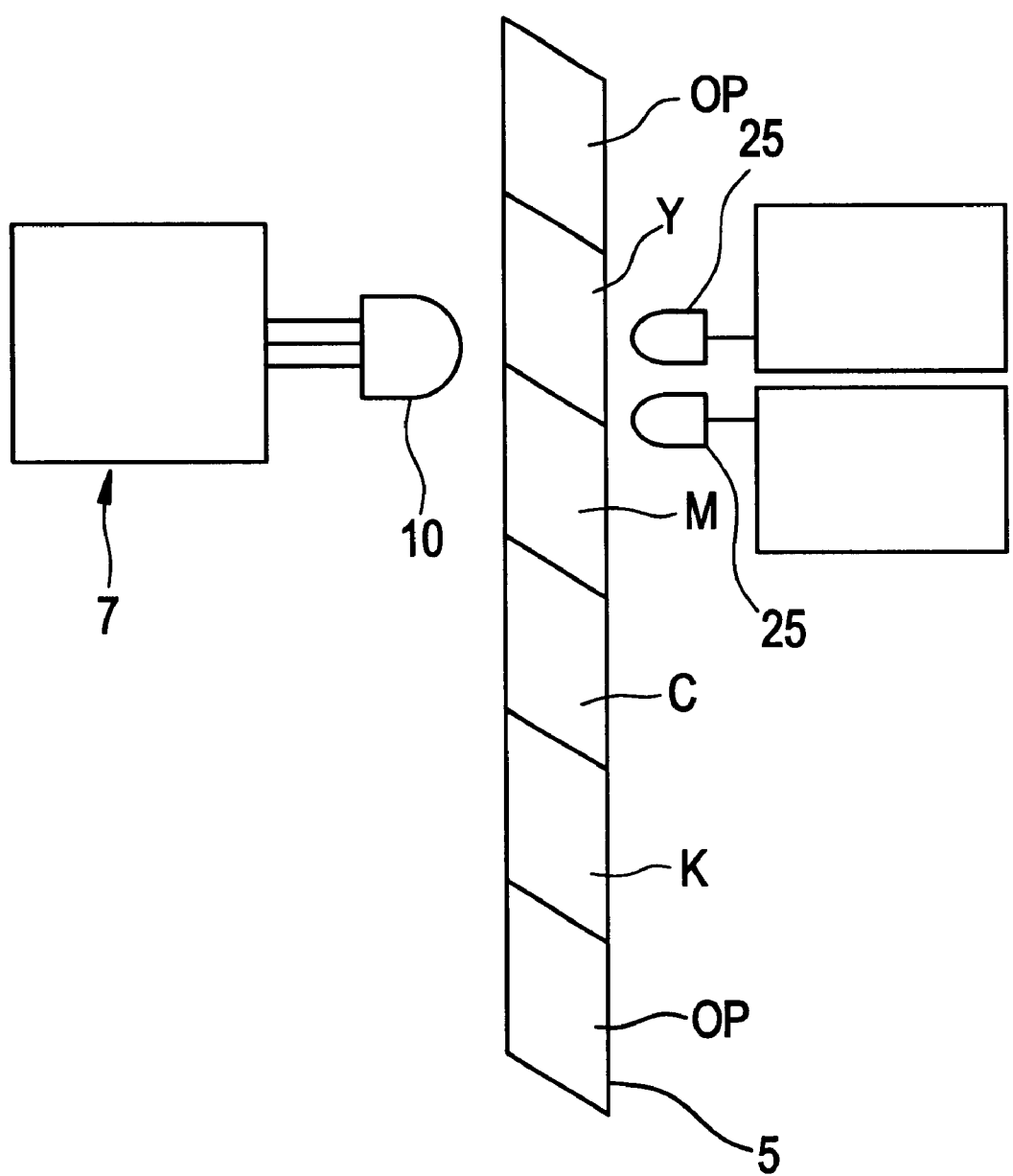
FIG. 13 is a schematic view showing an example of the structure of the color detecting sensor according to the second embodiment.

For example, the color detecting sensor 24 according to the embodiment includes two phototransistors, that is, a first phototransistor 25a and a second phototransistor 25b in the color detecting sensor described in the above embodiment (see FIG. 13). The phototransistor 25a and the phototransistor 25b are provided on the upstream and downstream sides in the delivery direction of the ink ribbon 5 in such a position that the boundary of the colors of the ink ribbon 5 is set between the first phototransistor 25a and the second phototransistor 25b on this side for one color of the ink ribbon 5, that is, the feed reel 28 side from the thermal head 26 if the head of a predetermined color of the ink ribbon 5 is present in a proper position in the vicinity of a transfer position of a head portion (hereinafter referred to as a thermal head 26 in the embodiment) for transferring the ink ribbon 5 to the medium. For example, in the case in which the head of a yellow portion (indicated as 5(Y) in FIG. 12) of the ink ribbon 5 is present in a proper position in the vicinity of the transfer position of the thermal head 26, for example, a boundary (shown in an arrow A of FIG. 12) between the yellow portion 5(Y) and a magenta portion (indicated as 5(M) in FIG. 12) of the ink ribbon 5 is present between the phototransistor 25a and the phototransistor 25b. Moreover, the LED array 10 is provided in a position opposite to the phototransistor 25a and the phototransistor 25b with the ink ribbon 5 interposed therebetween. A processing of deciding the colors of the ink ribbon 5 through the phototransistor 25 and the LED array 10 is the same as that in the embodiment described above. In the embodiment, the color detecting sensor 24 includes the two phototransistors 25a and 25b. Therefore, each color can be decided through the two phototransistors 25a and 25b.

According to an example, in the case in which the card 27 has a length of approximately 85.5 mm and each color of the ink ribbon 5 has a length of 98±1 mm, a distance along the ink ribbon 5 between the thermal head 26 to the second phototransistor 25b is set to 88 mm and a distance along the ink ribbon 5 between the second phototransistor 25b and the first phototransistor 25a is set to 8 mm and the first phototransistor 25a and the second phototransistor 25b are thus provided. A distance along the ink ribbon 5 between the thermal head 26 and the first phototransistor 25a is 96 mm and is shorter than a minimum tolerance of the length of each color of the ink ribbon 5.

In this case, if the first phototransistor 25a detects magenta and the second phototransistor 25b detects yellow in the state in which the power of the printer is ON as shown in FIG. 12, for example, the boundary between yellow and magenta is present between the phototransistor 25a and the phototransistor 25b and the length of the yellow ribbon required for printing on the card 27 can be maintained reliably. In other words, when the two phototransistors 25a and 25b detect different colors based on the positional relationship between the thermal head 26 and the phototransistors 25a and 25b, a ribbon color detected by the second phototransistor 25b close to the thermal head 26 is surely present under the thermal head 26, and furthermore, a length required for the printing can be maintained.

For example, the color detecting sensor 1 is provided in a position close to the thermal head 17 as shown in FIG. 8 according to the first embodiment described above. In this example, when the color detecting sensor 1 detects the point of change from the overprint layer to yellow, the printer regulates the head of yellow to come to a position passing through the thermal head 17 in order to stop the wind of the ink ribbon 5 after a predetermined time since the detection time. In this case, the ink ribbon 5 is controlled to be fed in a predetermined amount by using an encoder or the like, for example, such that the head of yellow reliably reaches the portion provided under the thermal head 17.

On the other hand, in the embodiment, the boundary of the colors of the ink ribbon 5 is detected through the color detecting sensor 24 on this side for one color of the ink ribbon 5 from the thermal head 26. Consequently, the operation for taking the head of the ink ribbon 5 to the thermal head 26 can be carried out simultaneously. For this reason, it is not necessary to carry out the operation for newly taking the head of the ink ribbon 5 separately. For example, it is not necessary to use an encoder for accurately measuring the feed amount of the ink ribbon 5 or the like. Consequently, the size and cost of the printer can be reduced.

Moreover, yellow and magenta are printed in this order, for example, and the final overprint layer is then printed.

Thereafter, the wind-up of the ink ribbon 5 is stopped in the state in which both the phototransistor 25a and the phototransistor 25b detect yellow or the phototransistor 25a detects magenta and the phototransistor 25b detects yellow. In this case, for example, even if the power of the printer is turned OFF before the next printing operation, it is not necessary to return the ink ribbon 5 placed under the thermal head 26 to the color detecting sensor 24 and to confirm the color. Thus, it is not necessary to carry out an extra operation for rewinding the ink ribbon 5. The reason is that whether or not the thermal head 26 and the ink ribbon 5 are placed in relative positions where the printing can be carried out can be grasped with the ink ribbon 5 stationary without carrying out the operation for rewinding the ink ribbon 5. Accordingly, it is not necessary to use a large-sized motor for applying a great back tension in order to carry out the operation for rewinding the ink ribbon 5. Consequently, the size and cost of the printer can be reduced. In this case, moreover, it is sufficient that the back tension acts to prevent the ink ribbon 5 from slacking, and there is no possibility that the ribbon might be cut.

Figure 14:
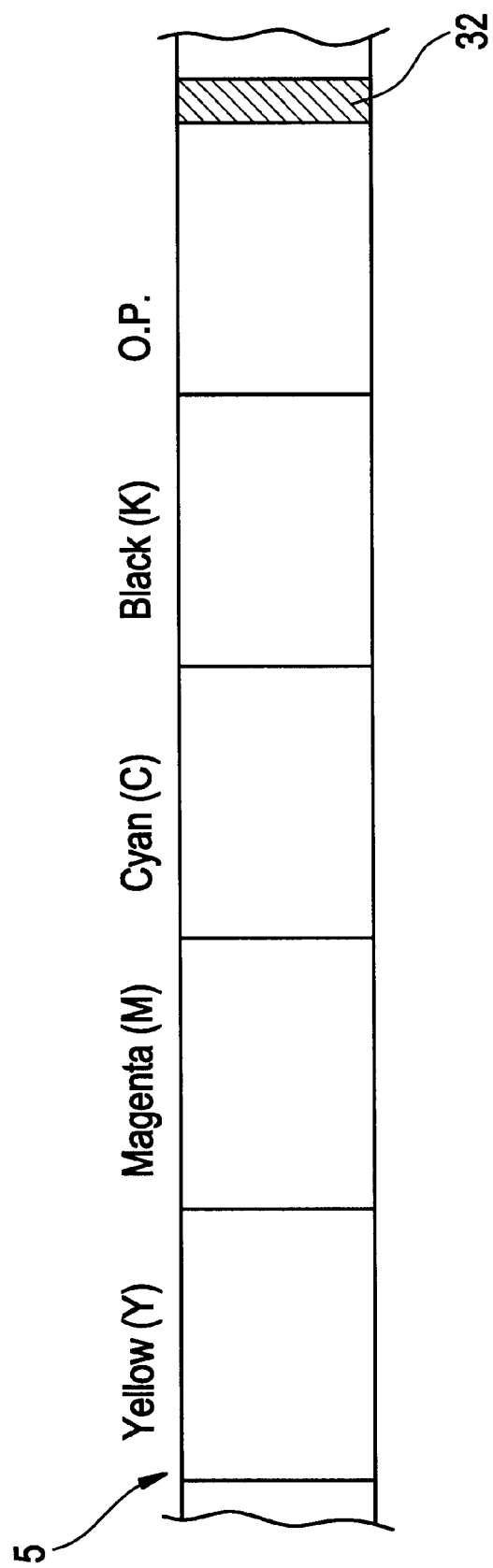
FIG. 14 is a schematic plan view showing an example in which a shielding label indicative of an end is given to the ink ribbon.

For example, furthermore, a shielding label 32 indicative of a termination (an end) of the ink ribbon 5 is given to the ink ribbon 5 as shown in FIG. 14. For example, the shielding label 32 is given to hide the next color of the overprint layer (yellow in the embodiment). In this case, while the color detecting sensor 24 normally detects yellow following the overprint layer, it detects black following the overprint layer because the output level of the phototransistor 25 is the same as that in the case of black through the shielding label 32. Accordingly, when the color detecting sensor 24 detects black following the overprint layer, the color detecting sensor 24 can be caused to function as an end detecting sensor of the ink ribbon 5 if a control section of the printer is caused to recognize the end of the ink ribbon 5, for example. In this case, it is not necessary to newly mount a sensor for end detection separately. Consequently, the size and cost of the printer can be reduced.

Moreover, the color detecting sensor 24 is not provided close to the thermal head 26. Therefore, the degree of freedom of the mounting method is also high.

As described above, the invention according to a second embodiment can achieve a predetermined object to simplify a conventional complicated mechanism for accurately measuring the feed amount of the ink ribbon 5 and to provide a color detecting sensor and a color detecting method for the ink ribbon 5 having an inexpensive and small-sized structure.

While the embodiment described above is a preferred example of the invention, it is not restricted but various changes can be made without departing from the scope of the invention.

Figure 15:
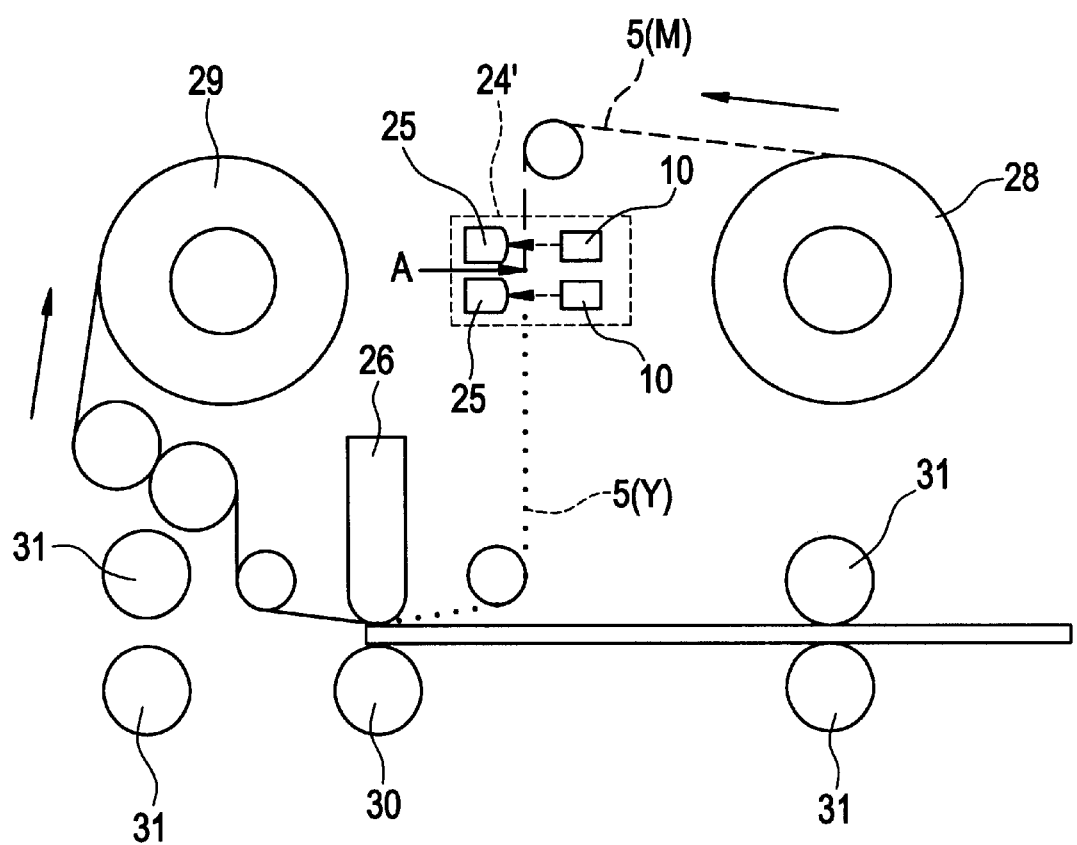
FIG. 15 is a schematic view showing a structure according to another example of the second embodiment of the color detecting sensor in accordance with the invention.

For example, even if a set of light receiving elements (for example, the phototransistors 25) and a set of light emitting elements (for example, the LED arrays 10) are mounted and two or more sets are used to constitute a color detecting sensor 24' as shown in FIG. 15, the same function as that of the color detecting sensor 24 can be maintained.

As is apparent from the above description, according to the first aspect of the invention, a color detecting sensor for an ink ribbon comprises a first light emitting element for emitting red light, a second light emitting element for emitting green light, a third light emitting element for emitting blue light, a light receiving element for receiving light emitted from each of the first, second and third light emitting elements through the ink ribbon, and detecting means for detecting a color of the ink ribbon forming at least a colorless and transparent portion and the colorless and transparent portion based on an output signal of the light receiving element, the detecting means including a storage section for storing, as color reference data, the output signal of the light receiving element when the first, second and third light emitting elements emit light through the colorless and transparent portion respectively, and a color deciding section for comparing, with the color reference data, the output signal of the light receiving element when the first, second and third light emitting elements emit light through the color formed on the ink ribbon respectively, thereby deciding the color of the ink ribbon. Consequently, it is possible to decide the corresponding color of the ink ribbon based on the characteristic of the output signal for each of the red light, the green light and the blue light. Thus, it is possible to properly detect colors without giving a special mark also in the ink ribbon including a colorless portion.

According to the second aspect of the invention, furthermore, the ink ribbon has five kinds of colors of yellow, magenta, cyan, black and a colorless portion. Accordingly, even if a special mark is not given to the ink ribbon, the colorless portion and yellow can be distinguished from each other. Thus, it is possible to constitute an ink ribbon capable of carrying out printing well. Moreover, all the colors of yellow, magenta, cyan, black and the overprint layer can be decided. Therefore, it is possible to constitute a printer having a smaller size more inexpensively than a printer for detecting only a specific color and specifying the position of the ink ribbon based on the feed amount therefrom.

According to the third aspect of the invention, moreover, a color detecting method for an ink ribbon comprises a first light emitting element for emitting red light, a second light emitting element for emitting green light, a third light emitting element for emitting blue light, a light receiving element for receiving light emitted from each of the first, second and third light emitting elements through the ink ribbon, and detecting means for detecting a color of the ink ribbon forming at least a colorless and transparent portion and the colorless and transparent portion based on an output signal of the light receiving element, the detecting means serving to store, as color reference data, the output signal of the light receiving element when the first, second and third light emitting elements emit light through the colorless and transparent portion respectively, and to compare, with the color reference data, the output signal of the light receiving element when the first, second and third light emitting elements emit light through the color formed on the ink ribbon, thereby deciding the color of the ink ribbon. Also in the ink ribbon including the colorless portion, therefore, it is possible to properly detect colors without giving a special mark and to constitute a printer having a smaller size more inexpensively.

According to the color detecting sensor for an ink ribbon in accordance with the fourth aspect of the invention and the color detecting method for an ink ribbon in accordance with the seventh aspect of the invention, furthermore, the boundary of the colors of the ink ribbon is detected on this side for one color of the ink ribbon from the head portion so that the start position of the color of the ink ribbon can be aligned with the head portion. For example, therefore, it is not necessary to use an encoder for accurately measuring the feed amount of the ink ribbon or the like. Moreover, the color detecting sensor can also be caused to function as an end detecting sensor of the ink ribbon. Consequently, it is not necessary to separately mount the sensor for end detection. Thus, it is possible to reduce the size and cost of the printer, for example.

According to the color detecting sensor for an ink ribbon in accordance with the fifth aspect of the invention and the color detecting method for an ink ribbon in accordance with the eighth aspect of the invention, furthermore, at least two light receiving elements are used. Consequently, even if the ink ribbon is stationary, the boundary of the colors of the ink ribbon can be detected on this side for one color of the ink ribbon from the head portion, thereby grasping that the head portion and the ink ribbon are set in relative positions where the printing can be carried out or not. Therefore, it is not necessary to use a large-sized motor for applying a great back tension in order to carry out an operation for rewinding the ink ribbon. Consequently, it is possible to reduce the size and cost of the printer. In this case, moreover, it is sufficient that the back tension is applied to prevent the ink ribbon from slacking and there is no possibility that the ribbon might be cut.

According to the color detecting sensor for an ink ribbon in accordance with the sixth aspect of the invention and the color detecting method for an ink ribbon in accordance with the ninth aspect of the invention, at least two colors constituting the boundary of the colors of the ink ribbon are detected on this side for one color of the ink ribbon from a head portion for transferring the ink ribbon to a medium and a start position of the color of the ink ribbon is aligned with the head portion. Therefore, it is not necessary to use an encoder for accurately measuring the feed amount of the ink ribbon or the like. Furthermore, since the boundary of the colors can be detected on this side for one color of the ink ribbon from the head portion, the end of the ink ribbon can also be detected. Consequently, it is not necessary to separately mount a sensor for end detection. Therefore, it is possible to reduce the size and cost of the printer, for example. Furthermore, even if the ink ribbon is stationary, the boundary of the colors of the ink ribbon can be detected on this side for one color of the ink ribbon from the head portion, thereby grasping that the head portion and the ink ribbon are set in relative positions where the printing can be carried out or not. Therefore, it is not necessary to use a large-sized motor for applying a great back tension in order to carry out an operation for rewinding the ink ribbon. Consequently, it is possible to reduce the size and cost of the printer. In this case, moreover, it is sufficient that the back tension is applied to prevent the ink ribbon from slacking and there is no possibility that the ribbon might be cut.

What is claimed is:

1. A color detecting sensor for an ink ribbon comprising:
   a first light emitting element for emitting red light;
   a second light emitting element for emitting green light;
   a third light emitting element for emitting blue light;
   a light receiving element for receiving light emitted from each of the first, second and third light emitting elements through the ink ribbon; and
   detecting means for detecting a color of the ink ribbon forming at least a colorless and transparent portion and the colorless and transparent portion based on an output signal of the light receiving element, the detecting means including a storage section for storing, as color reference data, the output signal of the light receiving element when the first, second and third light emitting elements emit light through the colorless and transparent portion respectively, and a color deciding section for comparing, with the color reference data, the output signal of the light receiving element when the first, second and third light emitting elements emit light through the color formed on the ink ribbon respectively, thereby deciding the color of the ink ribbon.

2. The color detecting sensor for an ink ribbon according to claim 1, wherein the ink ribbon has five kinds of colors of yellow, magenta, cyan, black and a colorless portion.

3. The color detecting sensor for an ink ribbon according to claim 1, wherein the light receiving element is provided on an upstream side in a delivery direction of the ink ribbon from a head portion for transferring the ink ribbon to a medium.

4. The color detecting sensor for an ink ribbon according to claim 3, further comprising another light receiving element which is provided an upstream side in a delivery direction of the ink ribbon from the head portion for receiving light emitted from each of the first, second and third light emitting elements through the ink ribbon, and said detecting means detects at least two colors constituting a boundary of the colors of the ink ribbon on the upstream side in a delivery direction of the ink ribbon from the head portion based on output signals of the light receiving elements.

5. The color detecting sensor for an ink ribbon according to claim 1, wherein the ink ribbon has four kinds of colors of yellow, magenta, cyan and a colorless portion.

6. A color detecting method for an ink ribbon comprising:
   emitting red light from a first light emitting element;
   emitting green light from a second light emitting element;
   emitting blue light from a third light emitting element;
   receiving at a light receiving element light emitted from each of the first, second and third light emitting elements through the ink ribbon; and
   detecting a color of the ink ribbon forming at least a colorless and transparent portion and the colorless and transparent portion by comparing color reference data corresponding to an output signal of the light receiving element when the first, second and third light emitting elements emit light through the colorless and transparent portion respectively, and the output signal of the light receiving element when the first, second and third light emitting elements emit light through the color formed on the ink ribbon respectively, thereby deciding the color of the ink ribbon.

7. The color detecting method for an ink ribbon according to claim 6, wherein the light receiving element is provided on an upstream side in a delivery direction of the ink ribbon from a head portion for transferring the ink ribbon to a medium and, and said detecting step comprises detecting a boundary of the colors of the ink ribbon on the upstream side in the delivery direction of the ink ribbon from the head portion.

8. The color detecting method for an ink ribbon according to claim 7, wherein said receiving step comprises receiving light emitted from the first, second and third light emitting elements through the ink ribbon at two light receiving elements provided on the upstream side in the delivery direction of the ink ribbon from the head portion, and said detecting step comprises detecting two colors constituting a boundary of the colors of the ink ribbon on the upstream side in the delivery direction of the ink ribbon from the head portion based on output signals of the two light receiving elements.

9. The color detecting method for an ink ribbon according to claim 6, wherein the ink ribbon has five kinds of colors of yellow, magenta, cyan, black and a colorless portion.

10. The color detecting method for an ink ribbon according to claim 6, wherein the ink ribbon has four kinds of colors of yellow, magenta, cyan and a colorless portion.

11. A color detecting sensor for an ink ribbon, comprising at least two color detecting sections for detecting a color of the ink ribbon, wherein said at least two color detecting sections are provided and serve to detect at least two colors constituting a boundary of the colors of the ink ribbon on an upstream side in a delivery direction of the ink ribbon from a head portion for transferring the ink ribbon to a medium.

12. A color detecting method for an ink ribbon, comprising the steps of:

detecting at least two colors constituting a boundary of colors of the ink ribbon on an upstream side in a delivery direction of the ink ribbon from a head portion for transferring the ink ribbon to a medium; and aligning a start position of the color of the ink ribbon with the head portion based on the detected two colors.

\* \* \* \* \*